United States Patent [19]

Sahagian

[11] 3,914,896

[45] Oct. 28, 1975

[54] FISHING LURE

[76] Inventor: Martin Sahagian, 1834 Minnesota Ave., South Milwaukee, Wis. 53172

[22] Filed: Nov. 15, 1974

[21] Appl. No.: 524,096

[52] U.S. Cl. .................... 43/44.6; 43/41; 43/42.49
[51] Int. Cl.² ........................................ A01K 85/00
[58] Field of Search ........... 43/44.6, 44.4, 42.49, 41

[56] References Cited
UNITED STATES PATENTS

| | | | |
|---|---|---|---|
| 2,207,319 | 7/1940 | Hollopeter | 43/44.6 |
| 2,780,885 | 2/1957 | Callahan | 43/44.6 |
| 2,940,208 | 6/1960 | Oswald | 43/44.6 |
| 3,457,666 | 7/1969 | Klinkhamer | 43/41 |

Primary Examiner—Hugh R. Chamblee
Assistant Examiner—Daniel J. Leach
Attorney, Agent, or Firm—Wheeler, Morsell, House & Fuller

[57] ABSTRACT

A minnow is clamped between a U-shaped lower body member and a downwardly curved upper body member which is pivotally connected between the sides of the lower body member about a transverse pivot axis. A pair of springs urge the rear end of the upper body member downwardly onto the minnow. The springs have forward portions that extend through the gills and mouth of the minnow and terminates in eyes for attachment to a fishing line. A lip extends downwardly from the front end of the lower body member to cause the lure to dive and to oscillate from side to side to simulate swimming movements. A stabilizing wire is attached at one end to the lip and has a hook at the other end for engaging the eyes on the springs. One or more fish hooks are attached to the rear of the lower body member.

5 Claims, 4 Drawing Figures

U.S. Patent Oct. 28, 1975 3,914,896
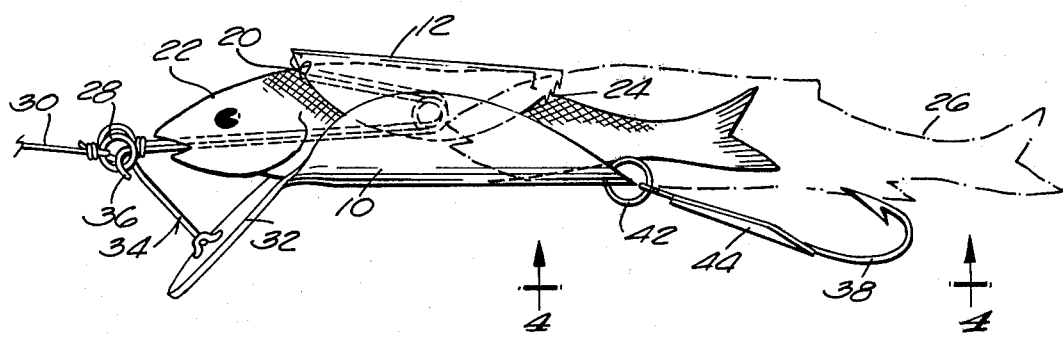
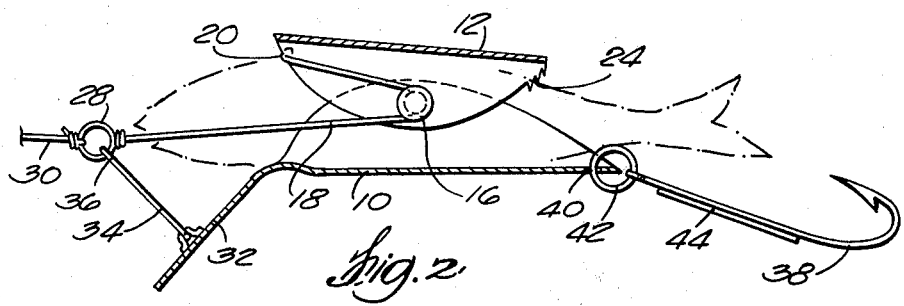
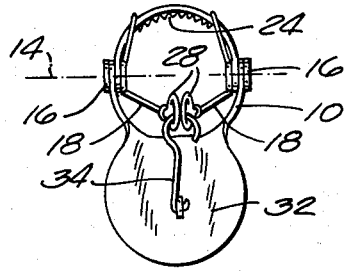
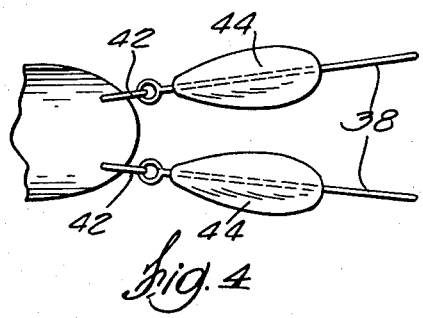

FISHING LURE

BACKGROUND OF THE INVENTION

This invention relates to fishing lures for use in combination with live or dead minnows. Many different types of minnow harnesses have been proposed in the past for use in trolling, bait casting, and spinning. However, these prior art minnow harnesses have required that the minnow be impaled, either from without or within, which tends to kill live minnows.

SUMMARY OF THE INVENTION

The fishing lure of this invention has a clamp structure within which a live minnow can be clamped and held without being impaled. The clamp includes a lower body member which is substantially U-shaped in cross section and an upper body member which is pivotally connected between the sides of the lower body member about a transverse pivot axis. A pair of springs are each attached to the upper body member to normally urge the rear end of the upper body member downwardly to clamp the minnow between the rear portions of the upper and lower body members. One end of each spring extends forwardly and has an eye formed therein for attachment to a fishing line. One or more fish hooks are attached to the rear of the lower body member.

DESCRIPTION OF THE DRAWINGS

FIG. 1 is a side view of one embodiment of the invention.

FIG. 2 is a longitudinal sectional view of the embodiment shown in FIG. 1.

FIG. 3 is a front view of the embodiments of FIGS. 1 and 2.

FIG. 4 is a fragmentary bottom view taken on the line 4—4 of FIG. 1.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

Referring to the drawings, one embodiment of the invention includes a lower body member 10 which is U-shaped in cross section (FIG. 3) and an upper body member 12 which is downwardly curved in cross section. Upper body member 12 is pivotally joined to lower body member 10 about a transverse pivot axis 14 by means of a pair of eyelets 16 which are clamped over matching holes in the sides of lower body member 10 and upper body member 12. A pair of spring wires 18 are secured to the inside of eyelets 16 and extend upwardly and forwardly and are bent at 20 to engage the front edge of upper body member 12. Springs 18 normally urge the rear end of upper body member 12 downward toward lower body member 10 to clamp a minnow 22 therebetween. The rear edge of upper body member 12 is preferably serrated at 24 to better grip minnow 22, which can be carried as far back as indicated by the dotted outline 26, if desired.

The lower portions of springs 18 extend forwardly and terminate in eyes 28 for attachment to a fishing line 30. When the minnow 22 is carried in the forward position indicated by the solid outline, the forward portions of springs 18 are passed through the minnow's gills and out the minnow's mouth. Passing the eyes 28 and springs 18 through the minnow's gills and mouth does not injure the minnow due to the relatively small size of eyes 28 and spring 18.

A lip 32 extends downwardly from the front end of lower body member 10. Lip 32 is integral with lower body member 10 and serves to cause the lure to dive and to oscillate from side to side as it is drawn through the water to simulate swimming movements. A stabilizing wire 34 is attached at one end to lip 32 by conventional means, e.g., by soldering in the case where lower body member 10 is made of metal, and a hook 36 is formed in the other end of stabilizing wire 34 to engage eyes 28.

A pair of fish hooks 38 are attached to holes 40 in the rear edge of lower body member 10 by conventional rings 42. Baffles 44 (FIG. 4) are preferably attached to the bottom of the shank portion of hooks 38 so that water pressure on baffles 44 will cause the points of hooks 38 to point upwardly when the lure is drawn through the water. This keeps the points of hooks 38 from catching on snags and weeds.

Upper body member 12 and lower body member 10 can be made of a suitable metal or plastic. Springs 18 and hooks 38 are made of steel and are preferably coated with a rust inhibiting material. Baffles 44 are also preferably made of steel which is coated with rust inhibiting material and are soldered to the shanks of hooks 38. Rings 42, eyelets 16, and stabilizing wire 34 are made of suitable metal and may also be coated with rust inhibiting material.

In using the lure of this invention, a minnow, either live or dead, is clamped between the upper body member 12 and lower body member 10 as shown in FIG. 1. The minnow may be placed at any desired position between the forward position shown by solid outline 24 and the rearward position shown by dotted outline 26. In the forward position, eyes 28 and the forward portion of springs 18 are passed through the gills and mouth of the minnow before upper body member 12 is released to clamp the minnow between upper body member 12 and lower body member 10.

I claim:

1. A fishing lure comprising a lower body member which is substantially U-shaped in cross section, an upper body member pivotally connected at two pivot points between the sides of said lower body member and extending thereacross, a pair of springs each attached to said upper body member and each acting to normally urge the rear end of said upper body member downwardly to clamp a fish bait between the rear portion of said upper and lower body members, one end of each spring extending forwardly and having an eye formed therein for attachment to a fishing line, and at least one fish hook attached to the rear of said lower body member, a downwardly extending lip on the front of said lower body member for causing the lure to dive and oscillate from side to side when drawn through the water, and a stabilizing wire attached at one end to said lip and having a hook formed at the other end of said stabilizing wire for engaging said eyes in the forwardly extending portions of said springs.

2. The lure of claim 1 wherein the rear end of said upper body member is serrated.

3. The lure of claim 1 wherein said upper body member is downwardly curved.

4. A fishing lure comprising a lower body member which is substantially U-shaped in cross section, an upper body member pivotally connected at two pivot points between the sides of said lower body member and extending thereacross, a pair of springs each attached to said upper body member and each acting to normally urge the rear end of said upper body member downwardly to clamp a fish bait between the rear portion of said upper and lower body members, one end of each spring extending forwardly and having an eye formed therein for attachment to a fishing line, and at least one fish hook attached to the rear of said lower body member, and a baffle attached to the shank portion of each fish hook on the side opposite the point thereof for lifting the point of said hook upwardly when said lure is drawn through the water.

5. A fishing lure comprising a lower body member which is substantially U-shaped in cross section, an upper body member pivotally connected at two pivot points between the sides of said lower body member and extending thereacross, a pair of springs each attached to said upper body member and each acting to normally urge the rear end of said upper body member downwardly to clamp a fish bait between the rear portion of said upper and lower body members, one end of each spring extending forwardly and having an eye formed therein for attachment to a fishing line, and at least one fish hook attached to the rear of said lower body member, said upper body member being pivotally connected to said lower body member by means of eyelets which are clamped through matching openings in said upper and lower body members.

* * * * *